US012272907B2

(12) United States Patent
Hsu et al.

(10) Patent No.: US 12,272,907 B2
(45) Date of Patent: Apr. 8, 2025

(54) POWER CONNECTION ASSEMBLY HAVING A ROTATING FUNCTION

(71) Applicant: POWERTECH INDUSTRIAL CO., LTD., New Taipei (TW)

(72) Inventors: Jung-Hui Hsu, New Taipei (TW); Chun-Yu Chen, New Taipei (TW); Chia-Cheng Wei, New Taipei (TW)

(73) Assignee: POWERTECH INDUSTRIAL CO., LTD., New Taipei (TW)

( * ) Notice: Subject to any disclaimer, the term of this patent is extended or adjusted under 35 U.S.C. 154(b) by 500 days.

(21) Appl. No.: 17/705,366

(22) Filed: Mar. 27, 2022

(65) Prior Publication Data

US 2023/0081872 A1 Mar. 16, 2023

(30) Foreign Application Priority Data

Sep. 16, 2021 (TW) ................................ 110210974

(51) Int. Cl.
*H01R 24/30* (2011.01)
*H01R 13/502* (2006.01)
(Continued)

(52) U.S. Cl.
CPC ........... *H01R 24/30* (2013.01); *H01R 13/502* (2013.01); *H01R 13/665* (2013.01); *H01R 24/68* (2013.01)

(58) Field of Classification Search
CPC ........ H01R 24/00; H01R 24/20; H01R 24/22; H01R 24/28; H01R 24/30; H01R 24/38; H01R 24/40; H01R 24/66; H01R 24/68; H01R 24/70; H01R 24/76; H01R 24/78; H01R 13/46; H01R 13/719; H01R 31/00; H01R 31/06
See application file for complete search history.

(56) References Cited

U.S. PATENT DOCUMENTS

| | | | | |
|---|---|---|---|---|
| 5,775,921 A * | 7/1998 | Chou | ..................... | H01R 24/28 439/21 |
| 2011/0045677 A1* | 2/2011 | Devlin | ................... | H01R 35/04 439/21 |
| 2020/0212641 A1* | 7/2020 | Liu | ........................ | H01H 13/14 |

FOREIGN PATENT DOCUMENTS

JP 3163289 U * 10/2010

OTHER PUBLICATIONS

JP-3163289-U original and translated documents (Year: 2010).*

* cited by examiner

*Primary Examiner* — Abdullah A Riyami
*Assistant Examiner* — Amara Anderson
(74) *Attorney, Agent, or Firm* — Li & Cai Intellectual Property Office

(57) ABSTRACT

A power connection assembly includes a housing, a plug, and a first and a second conductive member. The housing has a first opening. The plug is disposed in the housing, and includes a first rotating base, and a first and a second electrode terminal. The first rotating base is movably fitted into the first opening. The first and the second electrode terminal penetrate through the first rotating base to form a first and a second contact portion. The first conductive member includes a first clamping portion that includes two second elastic sheets. Each second elastic sheet has a first and a second elastic segment. The first elastic segment is L-shaped, and the second elastic segment is cylindrical. The second elastic segments of the two second elastic sheets are configured to clamp the first electrode terminal, so that the first electrode terminal electrically contacts the first conductive member.

12 Claims, 13 Drawing Sheets

(51) Int. Cl.

| | |
|---|---|
| ***H01R 13/66*** | (2006.01) |
| ***H01R 24/68*** | (2011.01) |

POWER CONNECTION ASSEMBLY HAVING A ROTATING FUNCTION

CROSS-REFERENCE TO RELATED PATENT APPLICATION

This application claims the benefit of priority to Taiwan Patent Application No. 110210974, filed on Sep. 16, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a power connection assembly, and more particularly to a power connection assembly having a rotating function.

BACKGROUND OF THE DISCLOSURE

In the related art, home appliances usually need to rely on connection of power plugs to sockets for receiving power. Sometimes, in order to match the position of the socket, the power plug needs to be inserted in different directions, which can easily cause excessive bending or rotation of a power cord connected to the power plug. As a result, the probability of wire damage is increased. In addition, after the conventional power plug is used for many times, a conductive structure inside the plug is liable to become loose, thereby resulting in poor electrical contact.

Therefore, how to overcome the above-mentioned deficiencies through an improvement in structural design has become one of the important issues to be solved in this field.

SUMMARY OF THE DISCLOSURE

In response to the above-referenced technical inadequacies, the present disclosure provides a power connection assembly.

In one aspect, the present disclosure provides a power connection assembly, which includes a housing, a plug, a first conductive member, and a second conductive member. The housing includes a first housing and a second housing. The first housing has a first opening, and the second housing is combined with the first housing. The plug is disposed in the housing. The plug includes a first rotating base, and a first electrode terminal and a second electrode terminal electrically isolated from each other. The first rotating base is movably fitted into the first opening. The first rotating base defines a first axis line, so that the first rotating base is capable of rotating about the first axis line. One end of the first electrode terminal penetrates through the first rotating base to form a first contact portion, and one end of the second electrode terminal penetrates through the first rotating base to form a second contact portion. The first conductive member includes a side wall and a first clamping portion formed by extending from two sides of the side wall. The first clamping portion includes two second elastic sheets that are arranged symmetrically and bent inwardly. Each of the second elastic sheets has one of two first elastic segments and one of two second elastic segments, the first elastic segment is L-shaped, and the second elastic segment is cylindrical. The second elastic segments of the two second elastic sheets are configured to clamp the first electrode terminal, so that the first electrode terminal electrically contacts the first conductive member. The second conductive member is a ring structure that surrounds the first conductive member. The second conductive member is configured to abut against one end of the second electrode terminal for electrical contact with the second electrode terminal.

In another aspect, the present disclosure provides a power connection assembly, which includes a housing, a plug, a first conductive member, and a second conductive member. The housing includes a first housing and a second housing. The first housing has a first opening, and the second housing is combined with the first housing. The plug is disposed in the housing. The plug includes a first rotating base, and a first electrode terminal and a second electrode terminal electrically isolated from each other. The first rotating base is movably fitted into the first opening. The first rotating base defines a first axis line, so that the first rotating base is capable of rotating about the first axis line. One end of the first electrode terminal penetrates through the first rotating base to form a first contact portion, and one end of the second electrode terminal penetrates through the first rotating base to form a second contact portion. The first conductive member includes a side wall, and a first clamping portion and a second clamping portion formed by extending from two sides of the side wall. The first clamping portion includes two second elastic sheets that are arranged symmetrically and bent inwardly. The two second elastic sheets are configured to clamp the first electrode terminal, so that the first electrode terminal electrically contacts the first conductive member. The second conductive member is a ring structure that surrounds the first conductive member. The second conductive member is configured to abut against one end of the second electrode terminal for electrical contact with the second electrode terminal.

Therefore, in the power connection assembly provided by the present disclosure, through the technical features of the plug includes a first rotating base, and a first electrode terminal and a second electrode terminal electrically isolated from each other and the first conductive member includes a side wall and a first clamping portion formed by extending from two sides of the side wall, the first clamping portion includes two second elastic sheets that are arranged symmetrically and bent inwardly, and the first clamping portion is configured to clamp and electrically contact the first contact portion, a power plug can have a rotating function, and the probability of bending a power cord can be reduced. Moreover, through the structural design of the first conductive member, a clamping strength between the first conductive member and the first electrode terminal is increased, thereby reducing the probability of loosening.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
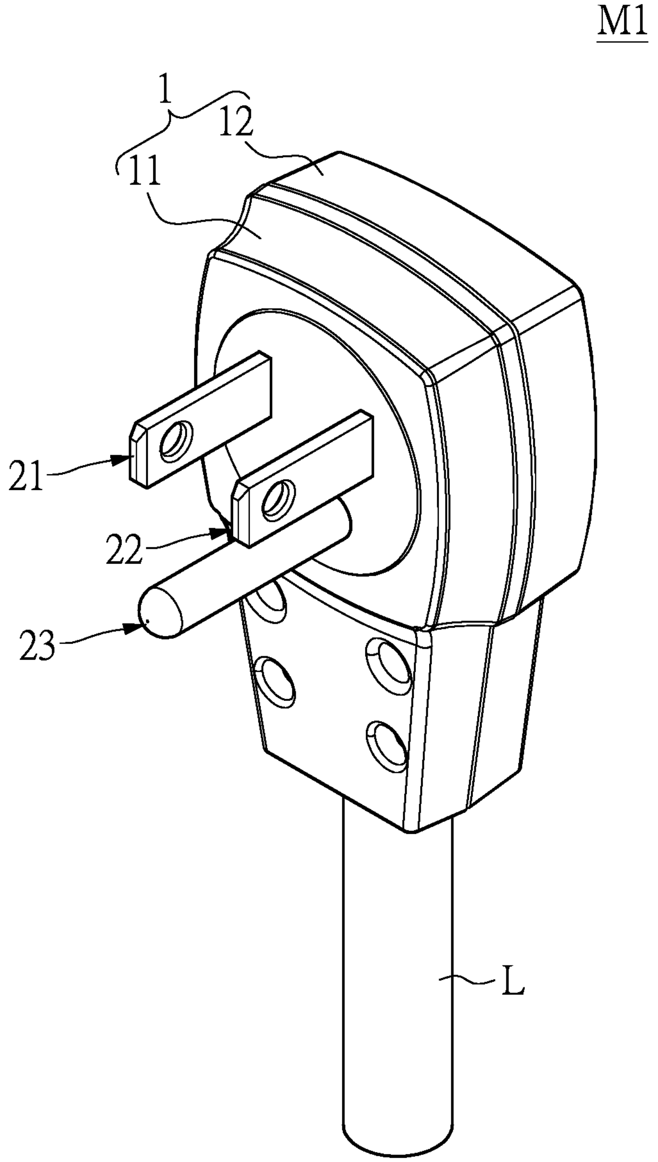
FIG. 1 is a schematic perspective view of a power connection assembly according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of “a”, “an”, and “the” includes plural reference, and the meaning of “in” includes “in” and “on”. Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as “first”, “second” or “third” can be used to describe various components, signals or the like, which are for distinguishing one component/signal from another one only, and are not intended to, nor should be construed to impose any substantive limitations on the components, signals or the like.

First Embodiment

Figure 2:
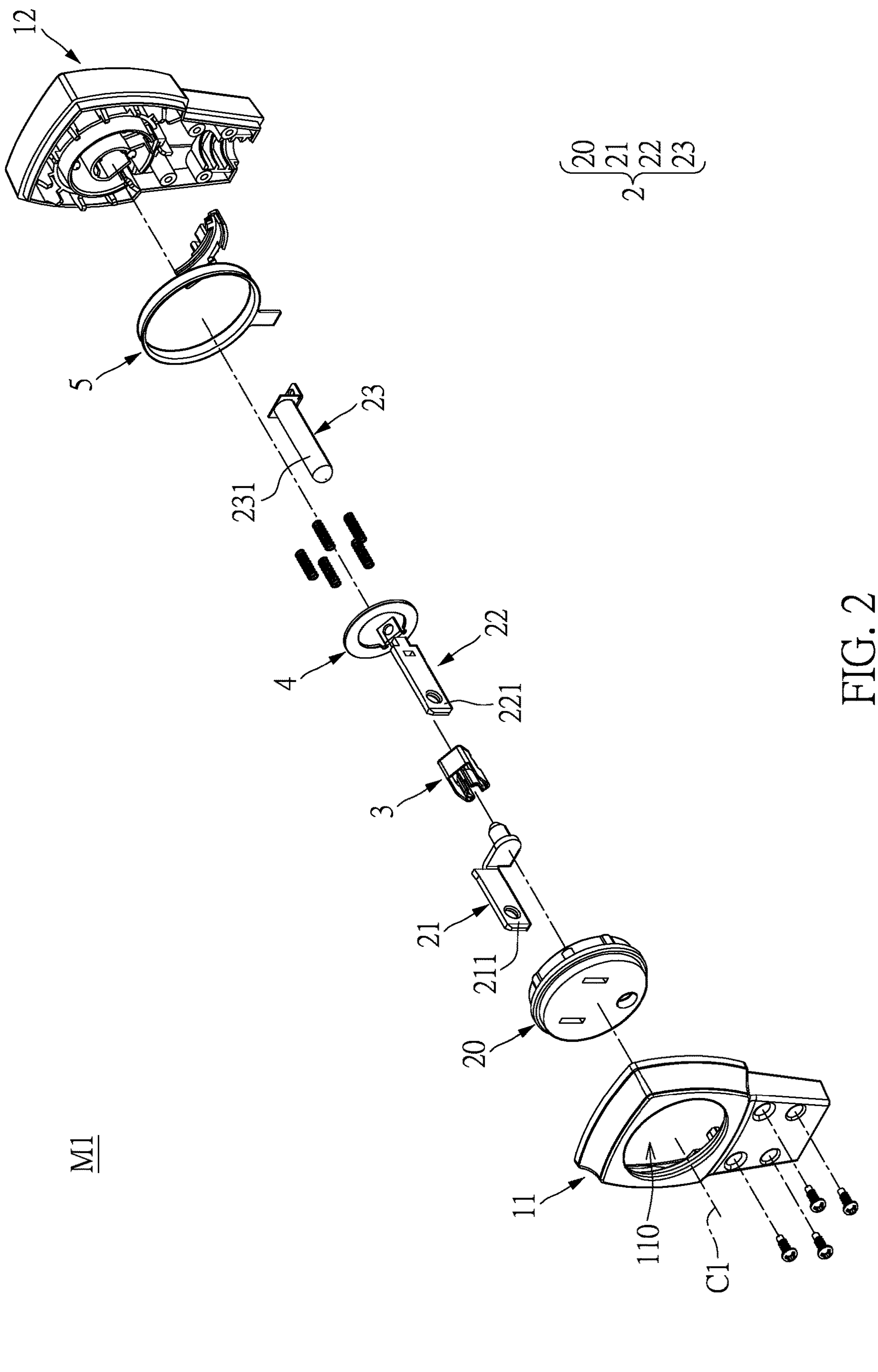
FIG. 2 is a schematic exploded view of the power connection assembly according to the first embodiment of the present disclosure.

Referring to FIG. 1 and FIG. 2, FIG. 1 is a schematic perspective view of a power connection assembly according to a first embodiment of the present disclosure, and FIG. 2 is a schematic exploded view of the power connection assembly according to the first embodiment of the present disclosure. The first embodiment of the present disclosure provides a power connection assembly M1. The power connection assembly M1 includes a housing 1, a plug 2, a first conductive member 3, and a second conductive member 4. For example, in this embodiment, the power connection assembly M1 is a power plug, which is externally connected to an external wire L. The housing 1 includes a first housing 11 and a second housing 12. The first housing 11 is detachably combined with the second housing 12 to form the housing 1, and an accommodating space is formed inside the housing 1. The plug 2 is disposed in the housing 1 (i.e., disposed in the accommodating space). The plug 2 includes a first rotating base 20, and a first electrode terminal 21 and a second electrode terminal 22 electrically isolated from each other. The first rotating base 20 is movably fitted into a first opening 110 of the housing 1. The first rotating base 20 can define a first axis line C1, so that the first rotating base 20 rotates about the first axis line C1. One end of the first electrode terminal 21 penetrates through the first rotating base 20 to form a first contact portion 211, and one end of the second electrode terminal 22 penetrates through the first rotating base 20 to form a second contact portion 221. Through the first contact portion 211 and the second contact portion 221, the power connection assembly M1 is inserted into an external power socket (such as a two-hole socket) for electrical connection.

Figure 3:
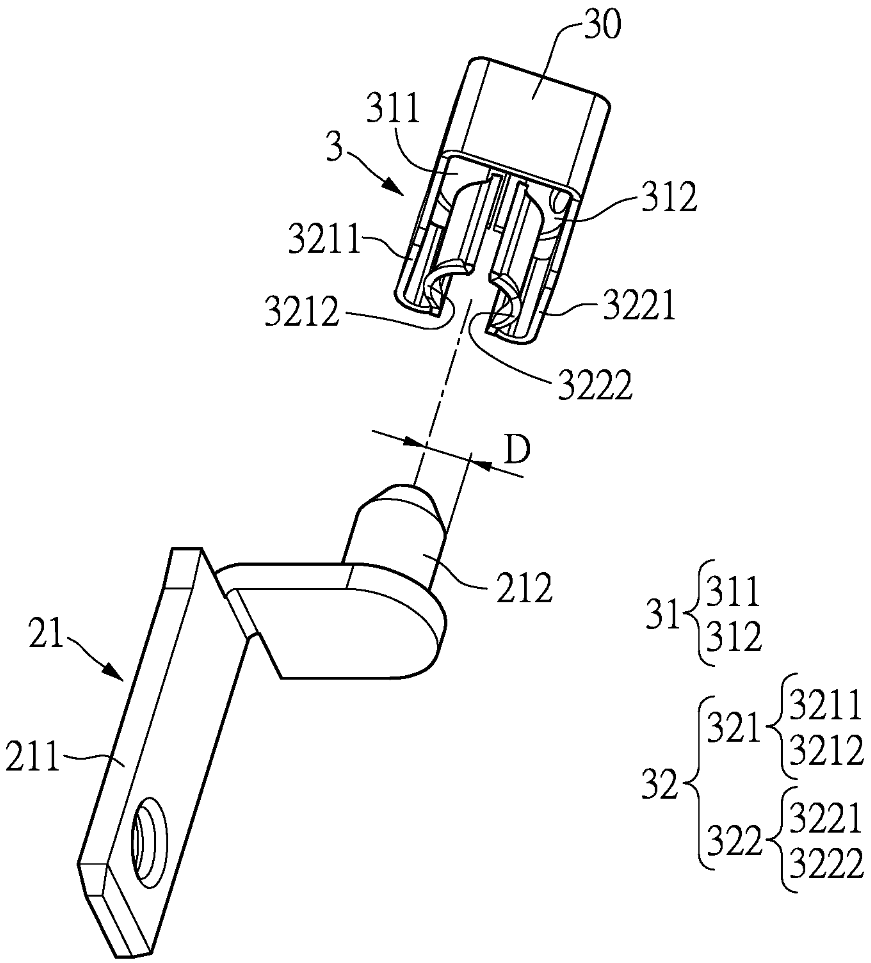
FIG. 3 is a schematic perspective view of one configuration of a first conductive member and a first electrode terminal of the power connection assembly according to the present disclosure.

Referring to FIG. 2 and FIG. 3, FIG. 3 is a schematic perspective view of one configuration of a first conductive member and a first electrode terminal of the power connection assembly according to the present disclosure. The first conductive member 3 includes a side wall 30, and a conductive portion 31 and a first clamping portion 32 formed by extending from two sides of the side wall 30. The first clamping portion 32 includes two second elastic sheets 321 and 322 that are arranged symmetrically and bent inwardly. When the power connection assembly M1 is assembled, the conductive portion 31 and the first clamping portion 32 of the first conductive member 3 are configured to clamp the first electrode terminal 21, so that the first electrode terminal 21 electrically contacts the first conductive member 3. Specifically, the conductive portion 31 and the first clamping portion 32 clamp an end of the first electrode terminal 21 on which a conductive post 212 is formed. The second conductive member 4 is a ring structure that surrounds the first conductive member 3. When the power connection assembly M1 is assembled, the second conductive member 4 abuts against one end of the second electrode terminal 22 for electrical contact with the second electrode terminal 22.

Referring to FIG. 1 and FIG. 2, the power connection assembly M1 further includes a third conductive member 5, and the plug 2 further includes a third electrode terminal 23. The first electrode terminal 21, the second electrode terminal 22, and the third electrode terminal 23 can be an integrated structure or a structure formed by combining separate bodies. The third conductive member 5 is an integrally-formed ring structure, and the third conductive member 5 surrounds the second conductive member 4. The third electrode terminal 23 penetrates through the first rotating base 20 to form a third contact portion 231. Through the first contact portion 211, the second contact portion 221, and the third contact portion 231, the power connection assembly M1 is inserted into an external power socket (such as a three-hole socket) for electrical connection. When the power connection assembly M1 is assembled, the third conductive member 5 abuts against one end of the third electrode terminal 23 for electrical contact with the third electrode terminal 23. Further, an order of conductive members in the housing 1 from inside to outside is the first conductive member 3, the second conductive member 4, and the third conductive member 5. In addition, one of the first conductive member 3, the second conductive member 4, and the third conductive member 5 and the electrode terminal that cooperates therewith for electrical contact (i.e., the first conductive member 3 and the corresponding first electrode terminal 21, the second conductive member 4 and the corresponding second electrode terminal 22, and the third conductive member 5 and the corresponding third electrode terminal 23) can rotate about the first axis line C1. At least one of the first electrode terminal 21, the second electrode terminal 22, and the third electrode terminal 23 passes through the first axis line C1. For example, in FIG. 2, a portion (i.e., the conductive post 212 as shown in FIG. 3) of the first electrode terminal 21 that is configured to couple to the first conductive member 3 passes through the first axis line C1.

Reference is further made to FIG. 3. In this embodiment, first elastic segments 3211 and 3221 and second elastic segments 3212 and 3222 are formed by the second elastic sheets 321 and 322 of the first clamping portion 32 of the first conductive member 3 bending inwardly. The first elastic segments 3211 and 3221 are L-shaped, and the second elastic segments 3212 and 3222 are cylindrical. The first clamping portion 32 clamps the conductive post 212 of the first electrode terminal 21 through the second elastic segments 3212 and 3222, and a clamping strength of the third conductive member 3 is increased by use of a force arm formed by extension of the first elastic segments 3211 and 3221. It should be noted that the present disclosure is not limited to the structure of the first conductive member 3 shown in FIG. 3. In addition, there is an offset between one of the first conductive member 3, the second conductive member 4, and the third conductive member 5 and the electrode terminal that cooperates therewith for electrical contact. For example, the conductive post 212 of the first electrode terminal 21 in FIG. 3 is configured to couple to the second elastic segments 3212 and 3222 of the first conductive member 3. Moreover, in the previous paragraph, the conductive post 212 is described to pass through the first axis line C1. As such, an offset D is provided between the first axis C1 and the second elastic segment 3222 (or 3212). Preferably, the offset D is 0.4 mm to 4 mm.

Figure 4:
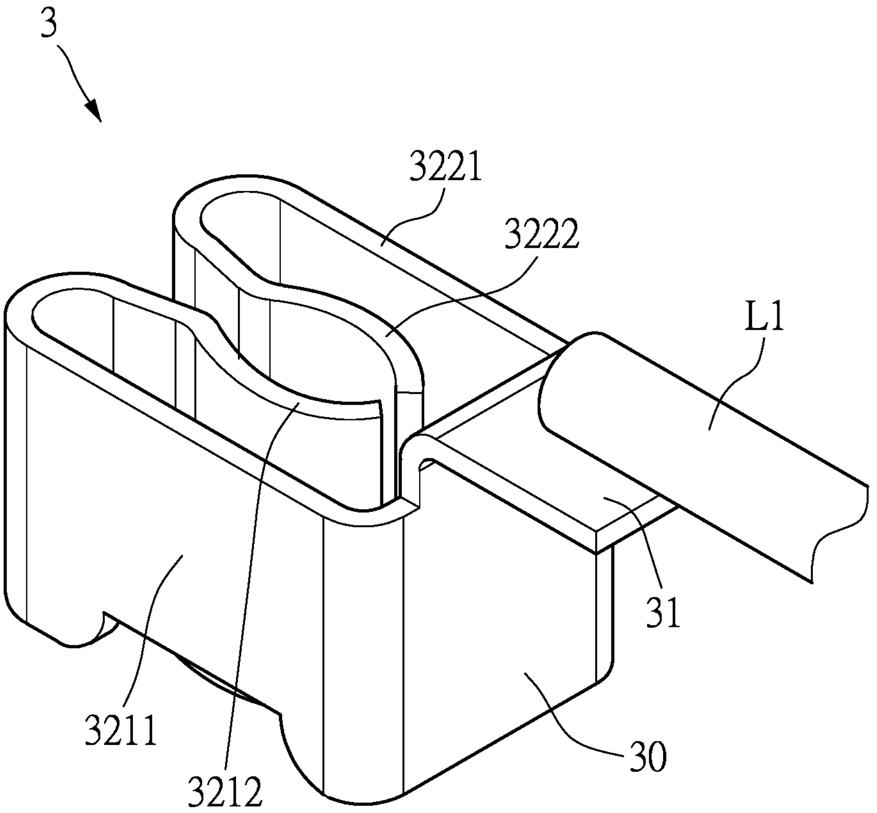
FIG. 4 is a schematic perspective view of another configuration of the first conductive member of the power connection assembly according to the present disclosure.

Next, different configurations of the first conductive member 3 are further described. Referring to FIG. 3 and FIG. 4, FIG. 4 is a schematic perspective view of another configuration of the first conductive member of the power connection assembly according to the present disclosure. The difference between FIG. 3 and FIG. 4 is that the conductive portion 31 of the first conductive member 3 can have different configurations. For example, the conductive portion 31 of the first conductive member 3 in FIG. 3 includes two first elastic sheets 311 and 312 extending from two sides of the side wall 30, and the two first elastic sheets 311 and 312 are bent inwardly. However, the conductive portion 31 of the first conductive member 3 in FIG. 4 extends from an upper side (or a lower side) of the side wall 30 and is presented as a sheet structure. The conductive portion 31 is mainly configured to be electrically connected to a conductive wire L1 (reference can be made to FIG. 11, in which one end of the conductive wire L1 is electrically coupled to the conductive portion 31, and another end is electrically coupled to a first electrode terminal clamp 81). It should be noted that, when the conductive portion 31 in FIG. 3 is configured to electrically couple to the conductive wire L1, the conductive wire L1 can be directly coupled to the first elastic sheets 311 and 312, and can also be wired by the side wall 30 (i.e., penetrating through the side wall 30 to couple to the first elastic sheets 311 and 312). In other words, how the conductive portion 31 and the conductive wire L1 are coupled with each other is not limited in the present disclosure.

Figure 5:
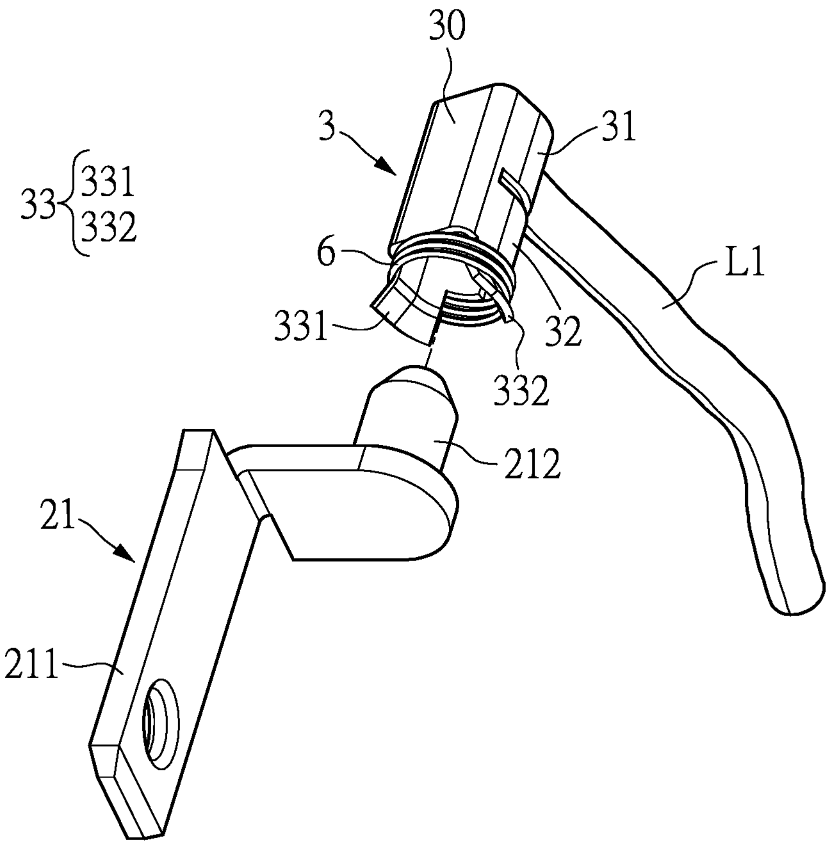
FIG. 5 is a schematic perspective view of another configuration of the first conductive member and the first electrode terminal of the power connection assembly according to the present disclosure.

Referring to FIG. 5, FIG. 5 is a schematic perspective view of another configuration of the first conductive member and the first electrode terminal of the power connection assembly according to the present disclosure. In FIG. 5, the power connection assembly M1 can further include an elastic member 6, and the first conductive member 3 further includes a second clamping portion 33. The first clamping portion 32 is disposed between the conductive portion 31 and the second clamping portion 33. The second clamping portion 33 includes two third elastic sheets 331 and 332 that are arranged symmetrically and expand outwardly. The elastic member 6 is configured to sleeve the two third elastic sheets 331 and 332. Thus, the first conductive member 3 improves the clamping strength through an elastic force of the elastic member 6.

Figure 6:
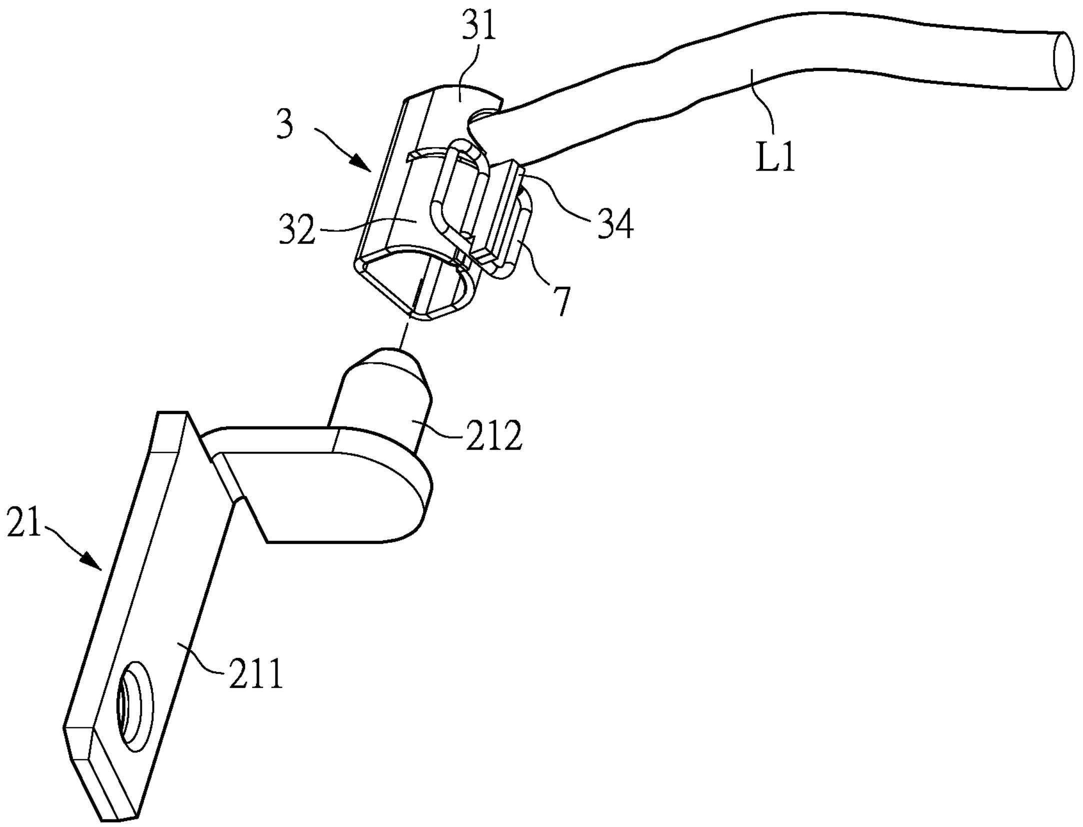
FIG. 6 is a schematic perspective view of yet another configuration of the first conductive member and the first electrode terminal of the power connection assembly according to the present disclosure.

Then, referring to FIG. 6, FIG. 6 is a schematic perspective view of yet another configuration of the first conductive member and the first electrode terminal of the power connection assembly according to the present disclosure. In FIG. 6, the power connection assembly M1 further includes a clamping fastener 7, and the first clamping portion 32 further includes two connecting segments 34. The two connecting segments 34 are formed by extending from the first clamping portion 32. Therefore, when the first conductive member 3 is sleeved on the conductive post 212 of the first electrode terminal 21, the clamping fastener 7 is clipped to the two connecting segments 34, and a clamping force is applied, so that the two connecting segments 34 abut against each other. In this way, the clamping strength of the first conductive member 3 is improved.

Second Embodiment

Figure 7A:
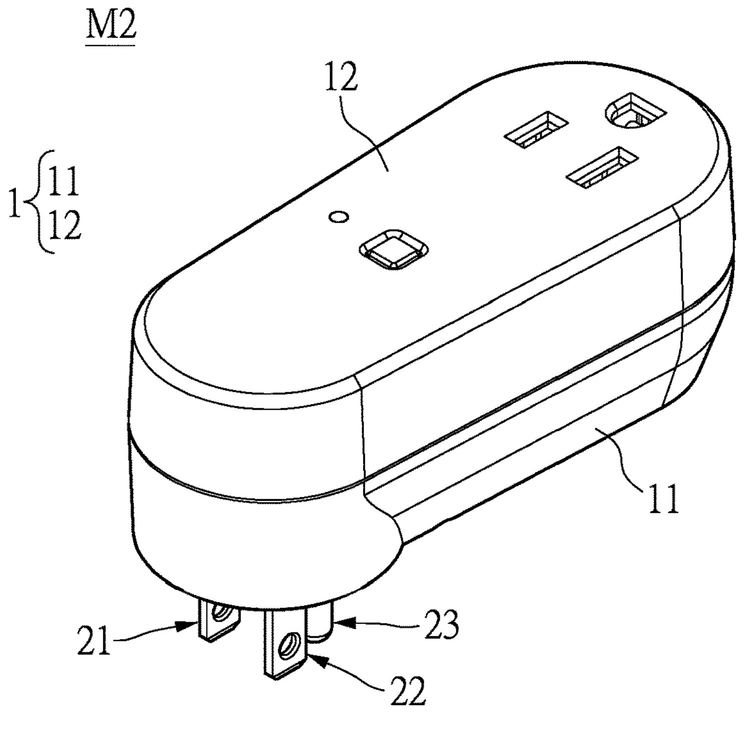
FIG. 7A is a schematic perspective view of a power connection assembly according to a second embodiment of the present disclosure.
Figure 8:
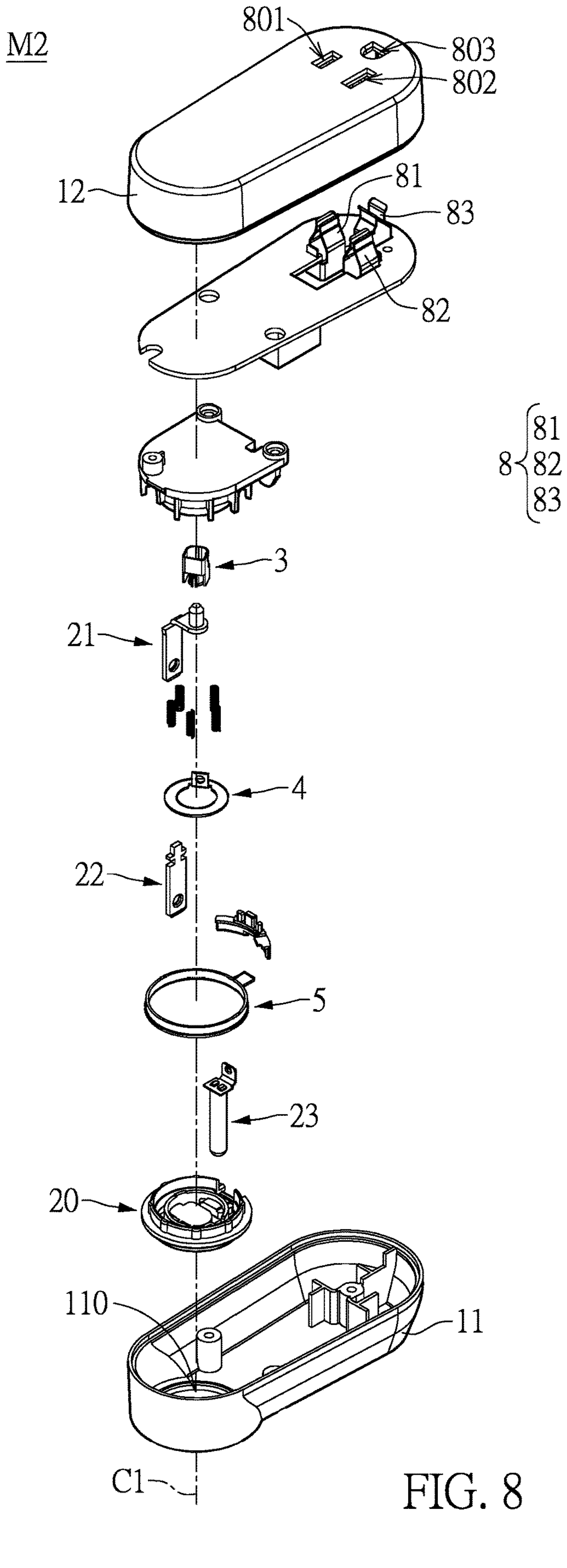
FIG. 8 is a schematic exploded view of the power connection assembly of FIG. 7A.

Referring to FIG. 7A and FIG. 8, FIG. 7A is a schematic perspective view of a power connection assembly according to a second embodiment of the present disclosure, and FIG. 8 is a schematic exploded view of the power connection assembly of FIG. 7A. The second embodiment provides a power connection assembly M2. The power connection assembly M2 includes a housing 1, a plug 2, a first conductive member 3, a second conductive member 4, a third conductive member 5, and a socket 8. A first electrode terminal 21, a second electrode terminal 22, and a third electrode terminal 23 can be an integrated structure or a structure formed by combining separate bodies. That is, a power plug and a power socket are both included in the power connection component M2. The housing 1 includes a first housing 11 and a second housing 12. The first housing 11 is detachably combined with the second housing 12 to form the housing 1. The plug 2 is disposed in the housing 1. The plug 2 includes a first rotating base 20, and the first electrode terminal 21, the second electrode terminal 22 and the third electrode terminal 23 electrically isolated from each other. The first conductive member 3, the second conductive member 4, and the third conductive member 5 electrically contact the first electrode terminal 21, the second electrode terminal 22, and the third electrode terminal 23, respectively. The first rotating base 20 is movably fitted into a first opening 110 of the housing 1. The first rotating base 20 can define a first axis line C1, so that the first rotating base 20 rotates about the first axis line C1. One end of the first electrode terminal 21 penetrates through the first rotating base 20 to form a first contact portion 211, one end of the second electrode terminal 22 penetrates through the first rotating base 20 to form a second contact portion 221, and the third electrode terminal 23 penetrates through the first rotating base 20 to form a third contact portion 231. Through the first contact portion 211, the second contact portion 221, and the third contact portion 231, the power connection assembly M2 is inserted into an external power socket (such as a three-hole socket) for electrical connection.

In continuation of the above, the socket 8 includes a first electrode terminal clamp 81 and a second electrode terminal clamp 82 electrically isolated from each other. The socket 8 is provided with a first jack 801 and a second jack 802 respectively corresponding to the first electrode terminal clamp 81 and the second electrode terminal clamp 82. Accordingly, when an external plug (such as a two-pin plug) is inserted into the socket 8, terminals of the external plug are respectively inserted into the first jack 801 and the second jack 802, so as to be electrically coupled to the first electrode terminal clamp 81 and the second electrode terminal clamp 82. In addition, the socket 8 can further include a third electrode terminal clamp 83. Therefore, when an external plug (such as a three-pin plug) is inserted into the socket 8, terminals of the external plug are respectively inserted into the first jack 801, the second jack 802, and the third jack 803, so as to be electrically coupled to the first electrode terminal clamp 81, the second electrode terminal clamp 82, and the third electrode terminal clamp 83. Moreover, the first electrode terminal clamp 81, the second electrode terminal clamp 82, and the third electrode terminal clamp 83 are electrically coupled to the first conductive member 3, the second conductive member 4, and the third conductive member 5, respectively. It should be noted that, in this embodiment, the structure of the first conductive member 3 can also have different configurations as shown in FIG. 3, FIG. 4, FIG. 5, and FIG. 6, details of which will not be reiterated herein.

Figure 7B:
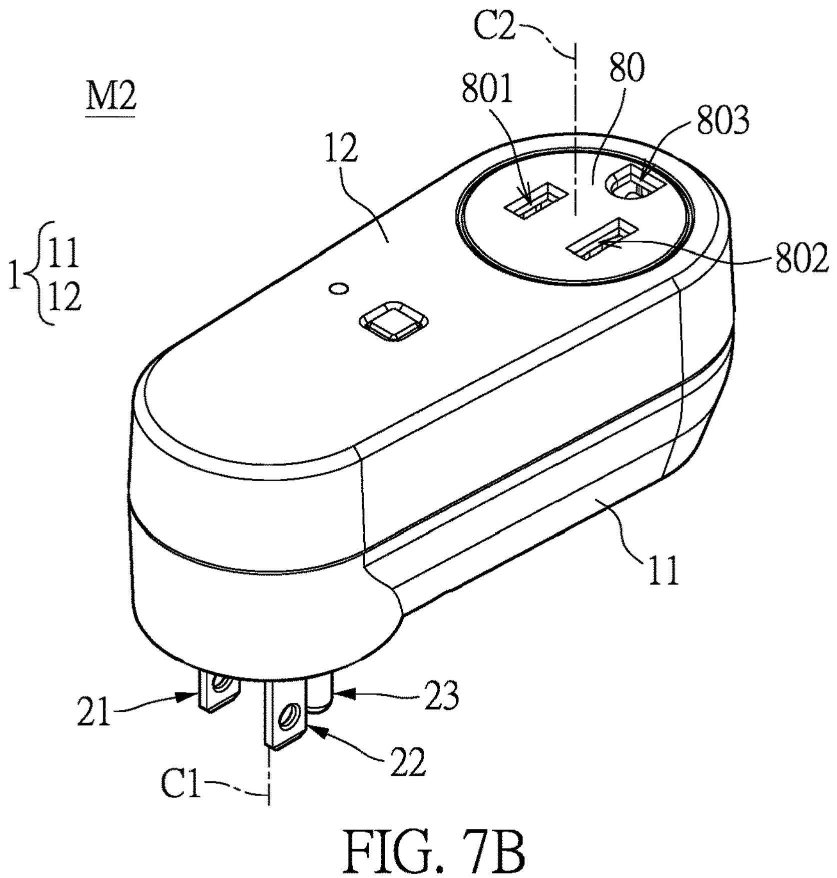
FIG. 7B is a schematic perspective view showing another example of the power connection assembly according to the second embodiment of the present disclosure.

In addition, referring to FIG. 7B, FIG. 7B is a schematic perspective view showing another example of the power connection assembly according to the second embodiment of the present disclosure. The structure shown in FIG. 7B is similar to that shown in FIG. 7A, and the similarities will not be repeated herein. The difference between FIG. 7B and FIG. 7A is that the power connection assembly M2 shown in FIG. 7B further includes a second rotating base 80, the second rotating base 80 is movably fitted into an opening formed in the second housing 12, and the first jack 801, the second jack 802, and the third jack 803 are formed in the second rotating base 80. Moreover, the second rotating base 80 defines a second axis line C2, so that the second rotating base 80 rotates about the second axis line C2. It is worth mentioning that the second axis line C2 is parallel to the first axis line C1.

Third Embodiment

Figure 9:
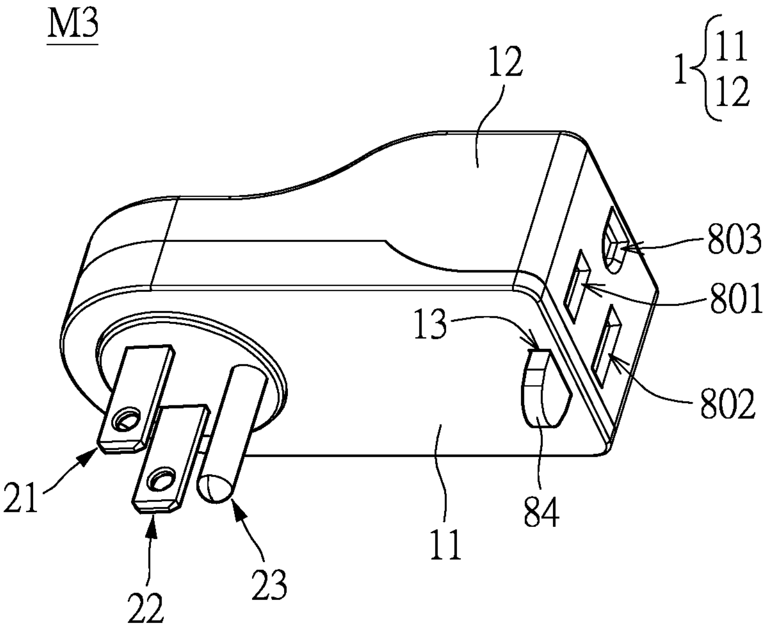
FIG. 9 is a schematic perspective view of a power connection assembly according to a third embodiment of the present disclosure.
Figure 10:
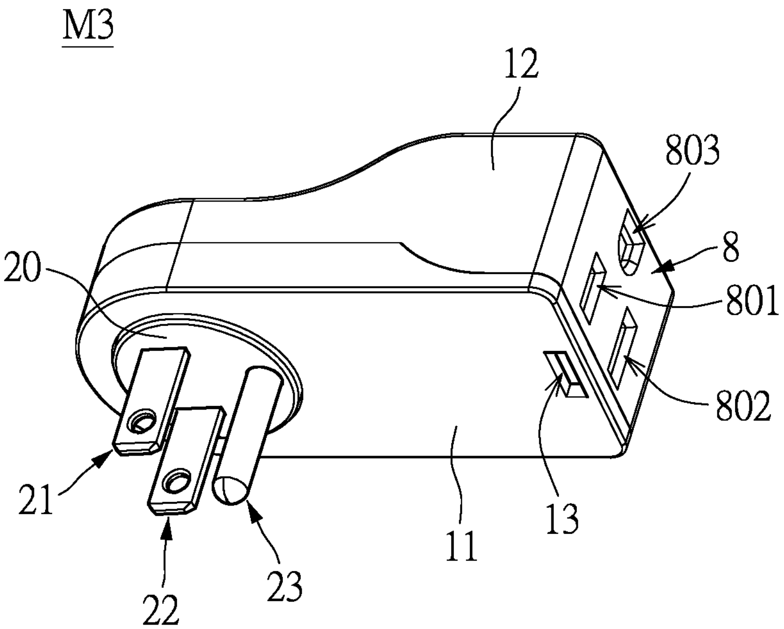
FIG. 10 is another schematic perspective view of the power connection assembly according to the third embodiment of the present disclosure.
Figure 11:
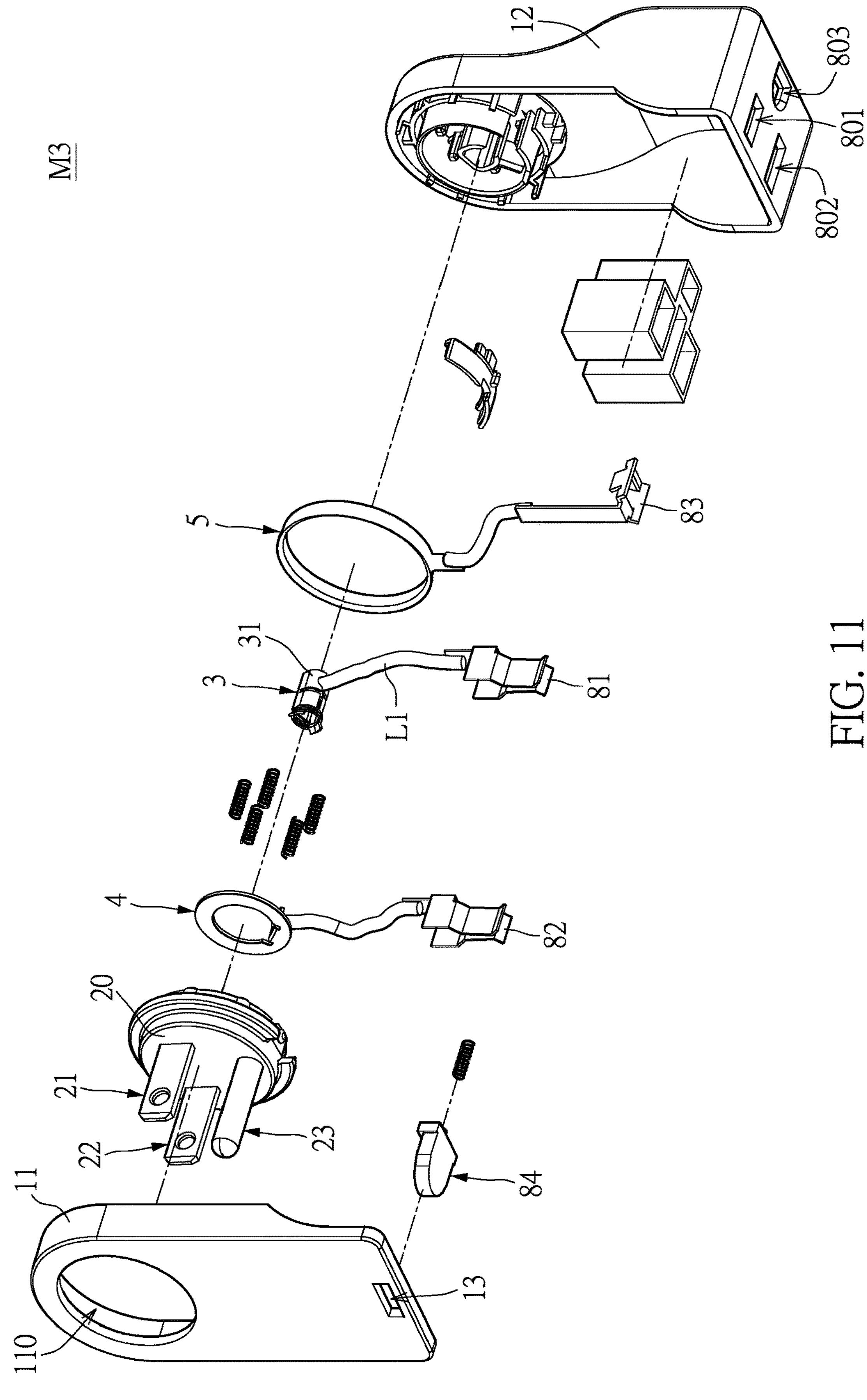
FIG. 11 is a schematic exploded view of the power connection assembly according to the third embodiment of the present disclosure.

Referring to FIG. 9 to FIG. 11, FIG. 9 is a schematic perspective view of a power connection assembly according to a third embodiment of the present disclosure, FIG. 10 is another schematic perspective view of the power connection assembly according to the third embodiment of the present disclosure, and FIG. 11 is a schematic exploded view of the power connection assembly according to the third embodiment of the present disclosure. The third embodiment provides a power connection assembly M3. The power connection assembly M3 includes a housing 1, a plug 2, a first conductive member 3, a second conductive member 4, a third conductive member 5, and a socket 8. A first electrode terminal 21, a second electrode terminal 22, and a third electrode terminal 23 can be an integrated structure or a structure formed by combining separate bodies. That is, a power plug and a power socket are both included in the power connection component M3. The housing 1 includes a first housing 11 and a second housing 12. The first housing 11 is detachably combined with the second housing 12 to form the housing 1. The plug 2 is disposed in the housing 1. The plug 2 includes a first rotating base 20, and the first electrode terminal 21, the second electrode terminal 22 and the third electrode terminal 23 electrically isolated from each other. The first conductive member 3, the second conductive member 4, and the third conductive member 5 electrically contact the first electrode terminal 21, the second electrode terminal 22, and the third electrode terminal 23, respectively. The first rotating base 20 is movably fitted into a first opening 110 of the housing 1. The first rotating base 20 can define a first axis line C1, so that the first rotating base 20 rotates about the first axis line C1. One end of the first electrode terminal 21 penetrates through the first rotating base 20 to form a first contact portion 211, one end of the second electrode terminal 22 penetrates through the first rotating base 20 to form a second contact portion 221, and the third electrode terminal 23 penetrates through the first rotating base 20 to form a third contact portion 231. Through the first contact portion 211, the second contact portion 221, and the third contact portion 231, the power connection assembly M3 is inserted into an external power socket (a three-hole socket) for electrical connection.

The main difference between the power connection assembly M3 and the power connection assembly M2 is the structure of the socket 8. The socket 8 of the power connection assembly M3 includes a first electrode terminal clamp 81, a second electrode terminal clamp 82, and a third electrode terminal clamp 83 electrically isolated from each other. The first electrode terminal clamp 81, the second electrode terminal clamp 82, and the third electrode terminal clamp 83 are electrically coupled to the first conductive member 3, the second conductive member 4, and the third conductive member 5, respectively. The second housing 12 is provided with a first jack 801, a second jack 802, and a third jack 803 respectively corresponding to the first electrode terminal clamp 81, the second electrode terminal clamp 82, and the third electrode terminal clamp 83. Thus, the socket 8 in this embodiment is unable to rotate. In addition, an insertion direction of an external plug into the socket 8 is perpendicular to an insertion direction of the plug 2 into an external socket. In addition, the first housing 11 further has a through hole 13. The socket 8 further includes a stopper 84. The stopper 84 is configured to pass through the through hole 13 and be exposed from the first housing 11. In this way, the stopper 84 can be used for direction identification when the external plug is inserted into the socket 8 (i.e., being used as a foolproof mechanism).

Fourth Embodiment

Figure 12:
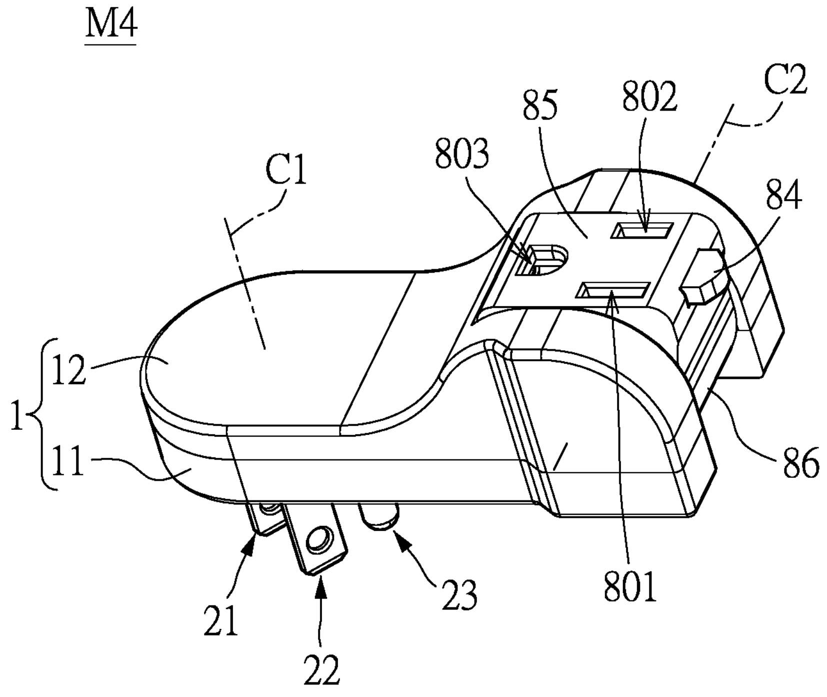
FIG. 12 is a schematic perspective view of a power connection assembly according to a fourth embodiment of the present disclosure.
Figure 13:
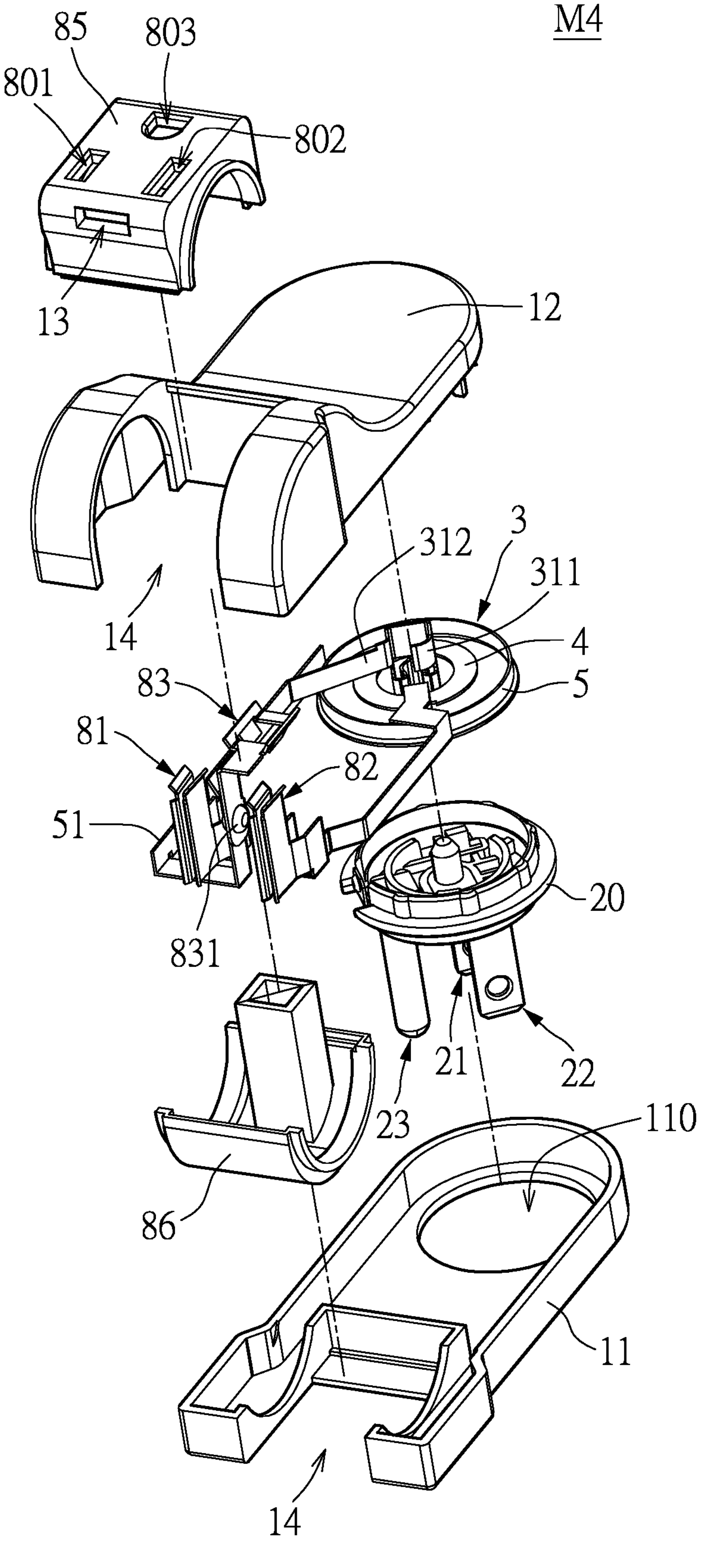
FIG. 13 is a schematic exploded view of the power connection assembly according to the fourth embodiment of the present disclosure.

Referring to FIG. 12 and FIG. 13, FIG. 12 is a schematic perspective view of a power connection assembly according to a fourth embodiment of the present disclosure, and FIG. 13 is a schematic exploded view of the power connection assembly according to the fourth embodiment of the present disclosure. The fourth embodiment is different from the second and third embodiments in the structure of the socket 8. The fourth embodiment provides a power connection assembly M4. The power connection assembly M4 includes a housing 1, a plug 2, a first conductive member 3, a second conductive member 4, a third conductive member 5, and a socket 8. A first electrode terminal 21, a second electrode terminal 22, and a third electrode terminal 23 can be an integrated structure or a structure formed by combining separate bodies. That is, a power plug and a power socket are both included in the power connection component M4. The housing 1 includes a first housing 11 and a second housing 12. The first housing 11 is detachably combined with the second housing 12 to form the housing 1. The plug 2 is disposed in the housing 1. The plug 2 includes a first rotating base 20, and the first electrode terminal 21, the second electrode terminal 22 and the third electrode terminal 23 electrically isolated from each other. The first electrode terminal clamp 81, the second electrode terminal clamp 82, and the third electrode terminal clamp 83 are electrically coupled to the first conductive member 3, the second conductive member 4, and the third conductive member 5, respectively. The first rotating base 20 is movably fitted into a first opening 110 of the housing 1. The first rotating base 20 can define a first axis line C1, so that the first rotating base 20 rotates about the first axis line C1. One end of the first electrode terminal 21 penetrates through the first rotating base 20 to form a first contact portion 211, one end of the second electrode terminal 22 penetrates through the first rotating base 20 to form a second contact portion 221, and the third electrode terminal 23 penetrates through the first rotating base 20 to form a third contact portion 231. Through the first contact portion 211, the second contact portion 221, and the third contact portion 231, the power connection assembly M4 is inserted into an external power socket (a three-hole socket) for electrical connection.

A recess 14 is formed on one side of the housing 1, and the one side is opposite to another side of the housing 1 that has the plug 2 disposed thereon. The socket 8 is movably disposed in the recess 14, and the socket 8 defines a second axis line C2, so that the socket 8 can rotate about the second axis line C2. Moreover, the second axis line C2 is perpendicular to the first axis line C1. The socket 8 includes a third housing 85 and a fourth housing 86 that are combined with each other, and a first electrode terminal clamp 81, a second electrode terminal clamp 82 and a third electrode terminal clamp 83 that are electrically isolated from each other. The first electrode terminal clamp 81, the second electrode terminal clamp 82, and the third electrode terminal clamp 83 are disposed in an accommodating space formed when the third housing 85 and the fourth housing 86 are combined with each other. The first electrode terminal clamp 81, the second electrode terminal clamp 82, and the third electrode terminal clamp 83 are electrically coupled to the first electrode terminal 21, the second electrode terminal 22, and the third electrode terminal 23, respectively. The third housing 85 is provided with a first jack 801, a second jack 802, and a third jack 803 respectively corresponding to the first electrode terminal clamp 81, the second electrode terminal clamp 82, and the third electrode terminal clamp 83. The third housing 85 further includes a stopper 84, and an extension direction of the stopper 84 is perpendicular to an insertion direction of an external plug into the socket 8. In this embodiment, the socket 8 can rotate about 90 degrees in the recess 14. Therefore, the first electrode terminal clamp 81 and the second electrode terminal clamp 82 in the socket 8 correspondingly have terminal clamp ports with a range of 90 degrees. Moreover, the third electrode terminal clamp 83 can be connected to a supporting arm 51 of the third conductive member 5 through a rotating shaft 831, so that the third electrode terminal clamp 83 can rotate with respect to the socket 8.

Figure 14:
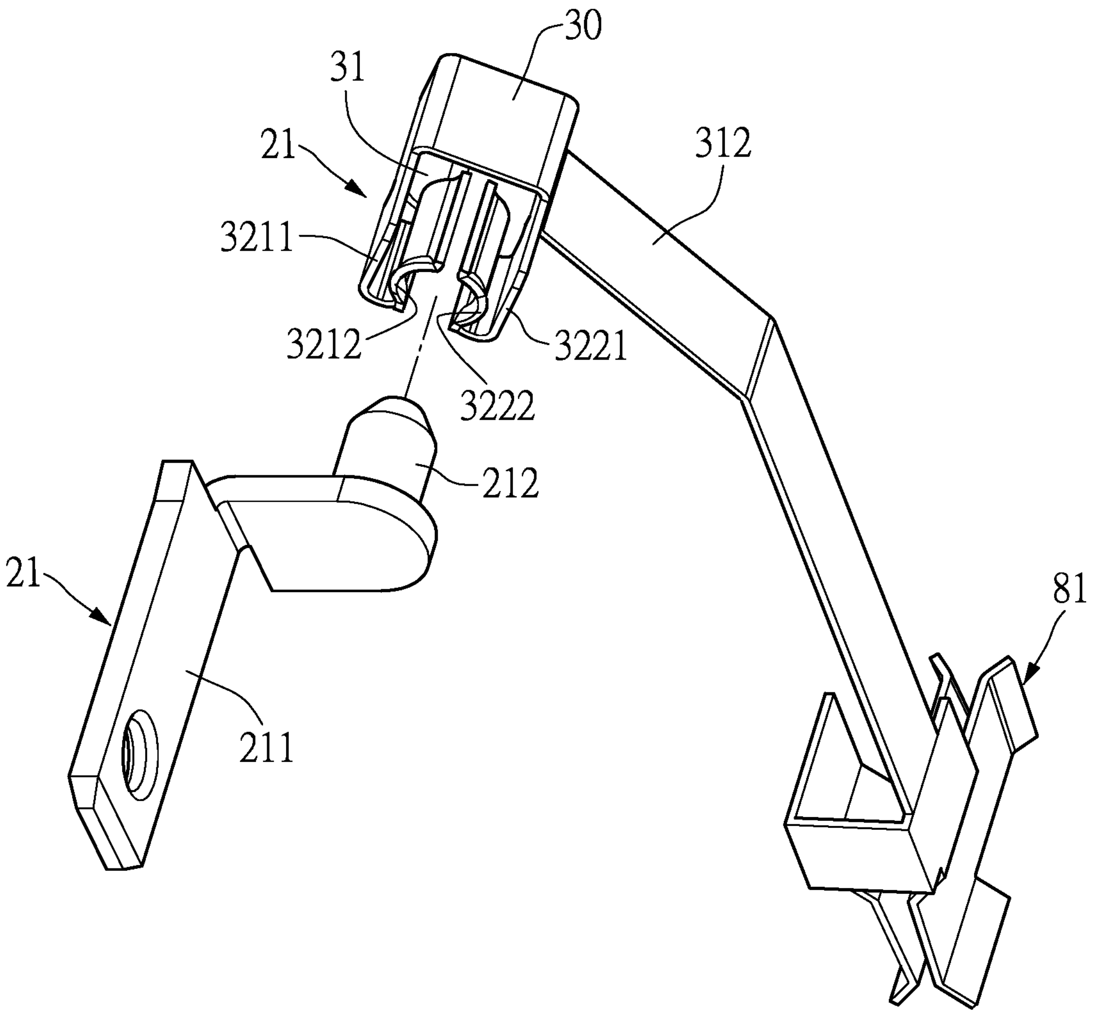
FIG. 14 is a schematic perspective view of still another configuration of the first conductive member and the first electrode terminal of the power connection assembly according to the present disclosure.

Referring to FIG. 14, FIG. 14 is a schematic perspective view of still another configuration of the first conductive member and the first electrode terminal of the power connection assembly according to the present disclosure. The structure of the first conductive member 3 shown in FIG. 14 is similar to that in FIG. 3. The difference is that the first elastic sheet 311 in the two first elastic sheets 311 and 312 of the conductive portion 31 is bent inwardly, while the first elastic sheet 312 is bent outwardly to be connected to the first electrode terminal clamp 81.

[Beneficial Effects of the Embodiments]

In conclusion, in the power connection assemblies M1-M4 provided by the present disclosure, through the technical features of the plug 2 includes a first rotating base 20, and a first electrode terminal 21 and a second electrode terminal 22 electrically isolated from each other and the first conductive member 3 includes a side wall 30, and a conducive portion 31 and a first clamping portion 32 formed by extending from two sides of the side wall 30, the conductive portion 31 includes two first elastic sheets 311 and 312 that are arranged symmetrically, at least one of the two first elastic sheets 311 and 312 is bent inwardly, the first clamping portion 32 includes two second elastic sheets 321 and 322 that are arranged symmetrically and bent inwardly, each of the second elastic sheets 321 and 322 has a first elastic segment 3211 or 3221 and a second elastic segment 3212 or 3222, the first elastic segment 3211 or 3221 is L-shaped, the second elastic segment 3212 or 3222 is cylindrical, and the two first elastic sheets 311 and 312 and the second elastic segments 3212 and 3222 of the two second elastic sheets 321 and 322 are configured to clamp the first electrode terminal 21, so that the first electrode terminal 21 electrically contacts the first conductive member 3, the power plug can have a rotating function, and the probability of bending a power cord can be reduced. Moreover, through the structural design of the first conductive member, a clamping strength between the first conductive member and the first electrode terminal is increased, thereby reducing the probability of loosening.

Further, the present disclosure provides different configurations of the first conductive member 3. For example, the first conductive member 3 further includes a second clamping portion 33. The second clamping portion 33 includes two third elastic sheets 331 and 332 that are arranged symmetrically and expand outwardly. The power connection assembly M1 is sleeved on the two third elastic sheets 331 and 332 through an elastic member 6. Thus, the first conductive member 3 improves the clamping strength through an elastic force of the elastic member 6. Alternatively, the first clamping portion 32 further includes two connecting segments 34, and the two connecting segments 34 are formed by extending from the first clamping portion 32. When the first conductive member 3 is sleeved on the conductive post 212 of the first electrode terminal 21, the power connection assembly M1 is clipped to the two connecting segments 34 through a clamping fastener 7, and a clamping force is applied, so that the two connecting segments abut against each other. In this way, the clamping strength of the first conductive member 3 is improved.

Still further, the power connection assembly includes a socket 8. The socket 8 includes a first electrode clamp 81 and a second electrode clamp 82 electrically isolated from each other. The socket 8 can be of a fixed type. That is, the second housing 12 is provided with a first jack 801 and a second jack 802 respectively corresponding to the first electrode terminal clamp 81 and the second electrode terminal clamp 82. Alternatively, a recess 14 is formed in an opposite side of a side of the housing 1 configured to dispose the plug 2. The socket 8 is movably disposed in the recess 14, and the socket 8 defines a second axis line C2, so that the socket 8 can rotate about the second axis line C2. The socket can further include a second rotating base and rotate through the second rotating base, and the second rotating base defines a second axis line. The second axis line can be parallel or perpendicular to the first axis line, so as to form different configurations.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A power connection assembly, comprising:

a housing, including:

a first housing having a first opening; and a second housing combined with the first housing;

a plug disposed in the housing, wherein the plug includes a first rotating base, and a first electrode terminal and a second electrode terminal electrically isolated from each other; wherein the first rotating base is movably fitted into the first opening; wherein the first rotating base defines a first axis line, so that the first rotating base is capable of rotating about the first axis line; wherein one end of the first electrode terminal penetrates through the first rotating base to form a first contact portion, and one end of the second electrode terminal penetrates through the first rotating base to form a second contact portion;

a first conductive member including a side wall and a first clamping portion formed by extending from two sides of the side wall, wherein the first clamping portion includes two second elastic sheets that are arranged symmetrically and bent inwardly, each of the second elastic sheets has one of two first elastic segments and one of two second elastic segments, the first elastic segment is L-shaped, the second elastic segment is cylindrical, and the two second elastic segments are disposed between the two first elastic segments; wherein the second elastic segments of the two second elastic sheets are configured to clamp the first electrode terminal, so that the first electrode terminal electrically contacts the first conductive member; and a second conductive member, wherein the second conductive member is a ring structure that surrounds the first conductive member, and the second conductive member is configured to abut against one end of the second electrode terminal for electrical contact with the second electrode terminal.

2. The power connection assembly according to claim 1, wherein the first conductive member further includes a conductive portion; wherein the conductive portion is formed by extending from an upper side, a lower side or both sides of the side wall, and the conductive portion is configured to be electrically connected to a conductive wire.

3. The power connection assembly according to claim 1, further comprising a third conductive member, wherein the plug further includes a third electrode terminal, the third conductive member is an integrally-formed ring structure, and the third conductive member surrounds the second conductive member; wherein the third electrode terminal penetrates through the first rotating base to form a third conductive portion, and the third conductive member is configured to abut against one end of the third electrode terminal for electrical contact with the third electrode terminal.

4. The power connection assembly according to claim 3, wherein one of the first conductive member, the second conductive member, and the third conductive member and the electrode terminal that cooperates therewith for electrical contact are capable of rotating about the first axis line; wherein at least one of the first electrode terminal, the second electrode terminal, and the third electrode terminal passes through the first axis line.

5. The power connection assembly according to claim 3, wherein an offset is provided between one of the first conductive member, the second conductive member, and the third conductive member and the electrode terminal that cooperates therewith for electrical contact; wherein the offset is 0.4 mm to 4 mm.

6. The power connection assembly according to claim 1, further comprising a socket, wherein the socket includes a second rotating base, and a first electrode terminal clamp and a second electrode terminal clamp electrically isolated from each other; wherein the second housing has a second opening; wherein the second rotating base is movably fitted into the second opening, the second rotating base defines a second axis line, and the second rotating base is provided with a first jack and a second jack respectively corresponding to the first electrode terminal clamp and the second electrode terminal clamp; wherein the second axis line is parallel to the first axis line, and the first electrode terminal clamp and the second electrode terminal clamp are electrically coupled to the first conductive member and the second conductive member, respectively.

7. The power connection assembly according to claim 1, further comprising a socket, wherein the socket includes a first electrode terminal clamp and a second electrode terminal clamp electrically isolated from each other, and the second housing is provided with a first jack and a second jack respectively corresponding to the first electrode terminal clamp and the second electrode terminal clamp; wherein the first electrode terminal clamp and the second electrode terminal clamp are electrically coupled to the first conductive member and the second conductive member, respectively.

8. The power connection assembly according to claim 7, wherein the socket further includes a third electrode terminal clamp, the second housing is further provided with a third jack corresponding to the third electrode terminal clamp, and the third electrode terminal clamp is electrically coupled to the third conductive member.

9. The power connection assembly according to claim 7, wherein the first housing further has a through hole, the socket further includes a stopper, and the stopper is configured to pass through the through hole and be exposed from the first housing.

10. The power connection assembly according to claim 1, further comprising a socket, wherein a recess is formed on one side of the housing, and the one side is opposite to another side of the housing that has the plug disposed thereon; wherein the socket is movably disposed in the recess, and the socket defines a second axis line; wherein the second axis line is perpendicular to the first axis line; wherein the socket includes a third housing and a fourth housing that are combined with each other, and a first electrode terminal clamp and a second electrode terminal clamp that are electrically isolated from each other; wherein the first electrode terminal clamp and the second electrode terminal clamp are disposed in an accommodating space formed when the third housing and the fourth housing are combined with each other; wherein the third housing is provided with a first jack and a second jack respectively corresponding to the first electrode terminal clamp and the second electrode terminal clamp, and the first electrode terminal clamp and the second electrode terminal clamp are electrically coupled to the first conductive member and the second conductive member, respectively.

11. The power connection assembly according to claim 10, wherein the socket further includes a third electrode terminal clamp, the third housing is further provided with a third jack corresponding to the third electrode terminal clamp, and the third electrode terminal clamp is electrically coupled to the third conductive member; wherein the third electrode terminal clamp is connected to the third conductive member through a rotating shaft, so that the third electrode terminal clamp rotates with respect to the socket.

12. The power connection assembly according to claim 10, wherein the third housing further includes a stopper, and an extension direction of the stopper is perpendicular to an insertion direction of an external plug into the socket.

* * * * *